United States Patent

Strojny et al.

[15] 3,668,244

[45] June 6, 1972

[54] OXIDATION OF 2-(2,4-DICHLOROPHENOXY) ETHANOL AND 2-(2,4,5-TRICHLOROPHENOXY) ETHANOL WITH NITRIC ACID TO THE CORRESPONDING PHENOXYACETIC ACID

[72] Inventors: Edwin J. Strojny; Ludo K. Frevel, both of Midland, Mich.

[73] Assignee: The Dow Chemical Company, Midland, Mich.

[22] Filed: Sept. 30, 1969

[21] Appl. No.: 862,511

[52] U.S. Cl. ........................................................260/521 A
[51] Int. Cl. ........................................................C07c 65/02
[58] Field of Search ............260/523 R, 531 R, 524 N, 521 A

[56] References Cited

UNITED STATES PATENTS

| | | | |
|---|---|---|---|
| 2,455,405 | 12/1948 | Burrows et al. | 260/531 R |
| 2,749,317 | 6/1956 | Pino | 260/524 N |

*Primary Examiner*—Lorraine A. Weinberger
*Assistant Examiner*—R. S. Weissberg
*Attorney*—Griswold & Burdick, Herbert D. Knudsen and D. J. Thurston

[57] ABSTRACT

Nitric acid is used to oxidize 2-(2,4-dichlorophenoxy)ethanol or 2-(2,4,5-trichlorophenoxy)ethanol to the corresponding phenoxyacetic acid by reaction with nitric acid at a temperature of 0° to 90° C. in a solvent having at least 0.5/1 parts by weight of benzenesulfonic acid to water plus sufficient sulfuric acid to maintain the total acid concentration of the reaction mixture between about 6 N and about 13 N throughout the reaction. The reaction is preferably conducted in an atmosphere of nitric oxide.

10 Claims, No Drawings

OXIDATION OF 2-(2,4-DICHLOROPHENOXY) ETHANOL AND 2-(2,4,5-TRICHLOROPHENOXY) ETHANOL WITH NITRIC ACID TO THE CORRESPONDING PHENOXYACETIC ACID

BACKGROUND OF THE INVENTION

Alcohols may be oxidized to the corresponding acid by a variety of oxidizing agents under acidic or alkaline conditions. Since oxidation by acidic reagents gives an appreciable quantity of ester formed by the reaction of the original alcohol with the acid obtained as the reaction product, most oxidations are conducted under alkaline conditions. By conducting the reaction under alkaline conditions, however, an additional acidification step is required in the isolation of the organic acid.

Oxidation with nitric acid in a high concentration of a strong acid has heretofore been deemed inadvisable because of the interfering nitration and esterification reactions, and the possible degradation of the reactants or products under the strenuous reaction conditions.

SUMMARY OF THE INVENTION

According to the present invention, 2-(2,4-dichlorophenoxy)ethanol or 2-(2,4,5-trichlorophenoxy)ethanol is oxidized to the corresponding phenoxyacetic acid by reacting the substituted ethanol with nitric acid at a temperature of 0° to 90° C. in a solvent having at least 0.5/1 parts by weight benzenesulfonic acid to water plus sufficient sulfuric acid to maintain the total acid concentration of the reaction mixture between about 6 N and about 13 N throughout the reaction. Such a strong acid oxidation provides a convenient and effective method of obtaining the corresponding phenoxyacetic acid without obtaining substantial quantities of the ester and nitration by-products or an extensive amount of degradation.

In the preferred process of the present invention, the solvent and substituted ethanol reactant are charged into a reactor. The reaction mixture is heated to about 50° C. and adjusted to an acid concentration of about 10 N with concentrated sulfuric acid. Under a nitric oxide atmosphere, about 10 to 20 percent of the nitric acid which will be added during the course of the reaction is initially charged into the reactor, and during the first hour of the reaction, the remainder of the nitric acid is added. The reaction is continued under constant conditions for a period of 5 to 6 hours, during which gas is evolved and solids appear in the liquid. At the end of the reaction, the reactor is cooled and the slurry containing the crystalline reaction product is filtered. The crystals obtained from filtration are then washed and purified according to known techniques.

An essential and novel feature of the present invention is the acidic reaction medium in which the oxidation may be conducted without the disadvantages shown in the art. Such a solvent system consists essentially of three elements: benzenesulfonic acid, water and sulfuric acid. The benzenesulfonic acid to water ratio is at least about 0.5/1 parts by weight with ratios of about 0.5/1 to about 3/1 being preferred. The upper limit of this ratio may vary widely so long as the benzenesulfonic acid is soluble in the reaction mixture, but at ratios lower than 0.5/1, the undesired ester is produced. The third component, sulfuric acid, is present in the solvent medium to the extent required to maintain the hydrogen ion concentration in the total reaction mixture between 6 N and 13 N. The term "N" signifies normality, in this context meaning the equivalents of titratable hydrogen ions per liter of the reaction mixture. Below 6 N the rate of oxidation is too slow and above 13 N the oxidation is vigorous and non-selective, resulting in the degradation of the starting materials. The preferred solvent system of the invention has a benzenesulfonic acid-water ratio of 0.5/1 to 2/1 with sufficient sulfuric present to maintain a hydrogen ion concentration of 7 N and 12 N in the total reaction mixture.

The solvent as described above and 2-(2,4-dichlorophenoxy)ethanol or 2-(2,4,5-trichlorophenoxy)ethanol are usually charged into the reactor before the addition of the nitric acid. The comparative quantities of solvent and substituted ethanol may vary widely. As a rule, about 0.5 to about 4 liters of the solvent are employed per gram mole of the ethanol reactant, with about 0.8 to about 2 liters of solvent being preferred for each mole of phenoxyethanol. Using these solvent to reactant ratios, relatively pure phenoxyacetic acid may be simply obtained as crystals by filtration of the reaction medium.

After the solvent and alcohol have been charged into the reactor, the nitric acid reactant is added. The amount, concentration and method of addition of the nitric acid may vary widely. Normally, although not necessarily, at least a stoichiometric molar amount of concentrated nitric acid is added slowly during the first hour of the reaction.

The stoichiometric molar ratio of the nitric acid to alcohol in the reaction is 1.3/1. A 10 to 100 percent stoichiometric excess of $HNO_3$ is usually preferred with a 20 to 70 percent excess being especially preferred. Below a molar ratio of nitric acid to alcohol of 1.3 the reaction is incomplete and molar ratios above 2.6 may cause excessive oxidation.

The concentration of the nitric acid may vary widely so long as the acid concentration in the total reaction mixture may be maintained between 6 N and 13 N with sulfuric acid and the minimum ratio of benzenesulfonic acid to water is met. Concentrated nitric acid, however, is usually employed and preferred in the reaction.

The method of addition of the nitric acid during the course of the reaction may vary widely. Preferably about 10 to about 20 percent of the nitric acid is initially charged into the reactor and the remainder is added slowly and continuously over a period of an hour or more.

To obtain the best results in the reaction, a suitable gaseous atmosphere should be employed in addition to the solvent system of the invention. Although the reaction may be conducted in the presence of air or oxygen, an atmosphere which is essentially oxygen-free is preferred. Gaseous atmospheres containing nitrogen, helium, argon, nitric oxide, nitrogen dioxide or mixture thereof are preferred, with atmospheres consisting essentially of nitric oxide being especially preferred. Generally, the reaction mixture is saturated with the gas and the reaction is conducted at normal atmospheric pressure although subatmospheric and superatmospheric pressures may also be employed. The temperature of the oxidation reaction may vary widely. Preferably the reaction is conducted within a temperature range of 0° to 90° C. with temperatures of 25° to 60° C. being preferred. At temperatures lower than the range given, the rate of reaction is generally unacceptably slow and at temperatures above the boiling point of water, the selectivity of the reaction drops off and the yield is decreased.

When the reaction is conducted under the temperature conditions defined above in a nitric oxide atmosphere, the time required for substantial completion of the reaction is about 2 to 8 hours. Shorter reaction times may be employed, but the reaction is generally incomplete. Reaction times greater than 8 hours are usually not detrimental to the reaction as long as there is not a substantial excess of nitric acid left over after complete oxidation. Such excess may cause further oxidation and possible degradation of the product.

Thus, by the use of the process of the present invention, oxidation of chlorinated phenoxyethanol to the corresponding acetic acid is obtained without substantial formation of the corresponding esters or nitration products and without substantial degradation of the reactants or products during the reaction. The compounds of the present invention are known and useful as herbicides — (2,4-dichlorophenoxy)acetic acid, commonly called 2,4-D, being of special interest.

SPECIFIC EMBODIMENTS

Examples 1–8

In a reactor maintained in a constant temperature bath equipped with a thermometer, stirrer, reflux condenser and conduit for introducing a gas, 2-(2,4-dichlorophenoxy)ethanol was oxidized according to the present invention. The solvent, reactant ratios and conditions of reaction are given in Table I. The addition of the nitric acid is shown in two columns: the first column shows the amount of acid that was initially charged into the reactor, and the second column shows the subsequent additions of nitric acid which were added to the reactor in a dropwise manner over the first hour of reaction. In each case, the solvent system in the reactor was saturated with nitric oxide and the reaction was conducted under a pressure of essentially 1 atmosphere of nitric oxide. The results of these parallel experiments are shown in Table I.

TABLE I

[Oxidation of 2(2,4-dichlorophenoxy)ethanol]

| Ex. No. | Benzene-sulfonic acid.$H_2O$, g. | $H_2O$, ml. | 96% $H_2SO_4$, ml. | 70% $HNO_3$, ml. | | Dichloro-phenoxy ethanol, g. | Reaction temp., ±1° C. | Reaction time, hr. | Product g. | Product analysis, wt. percent | | | |
|---|---|---|---|---|---|---|---|---|---|---|---|---|---|
| | | | | Initial | Subsequent | | | | | (1) | (2) | (3) | (4) |
| 1 | 112.5 | 60 | 18 | 3 | 21 | 41.4 | 50 | 6 | 41.3 | 97.3 | <0.1 | 2.5 | <0.1 |
| 2 | 112.5 | 60 | 16 | 24 | ---------- | 41.4 | 45 | 6 | 37.2 | 91.9 | 0.3 | 6.8 | -------- |
| 3 | 112.5 | 60 | 17 | 12 | 12 | 41.4 | 45 | 6 | 33.3 | 90.0 | 0.3 | 9.7 | -------- |
| 4 | 112.5 | 60 | 18 | 24 | ---------- | 41.4 | 45 | 6 | 35.6 | 93.7 | -------- | 3.2 | 3.1 |
| 5 | 650 | 560 | 300 | 50 | ---------- | 103.5 | 45 | 5 | 90 | 95.3 | 0.7 | 3.6 | 0.4 |
| 6 | 112.5 | 60 | 18 | 6 | 18 | 41.4 | 45 | 6 | 42.2 | 93.6 | -------- | 6.4 | -------- |
| 7 | 112.5 | 60 | 18 | 3 | 21 | 41.4 | 45 | 6 | 40.5 | 98.1 | -------- | 1.9 | -------- |
| 8 | 112.5 | 60 | 18 | 3 | 21 | 41.4 | {40<br>{60 | 4}<br>2} | 38.9 | 96.3 | 0.4 | 2.1 | 1.2 |

(1) = (2,4-dichlorophenoxy)acetic acid.
(2) = 2(2,4-dichlorophenoxy)ethanol.
(3) = 2(2,4-dichlorophenoxy)ethyl (2,4-dichlorophenoxy)acetate.
(4) = 2,4-dichloro-6-nitrophenol.

Examples 9–12

In a manner similar to the examples given above, parallel experiments were run to determine the effect of the atmosphere on the course of the reaction. The reactant ratios, conditions of reaction and product analysis are shown in Table II.

TABLE II

[Effect of different gaseous atmospheres on the oxidation of 2(2,4-dichlorophenoxy)ethanol at 45° C.]

| Example No. | Benzene-sulfonic acid, g. mmole | $H_2O$, ml. g. | $H_2SO_4$, mmole g. | $HNO_3$, mmole | Dichlorophenoxy ethanol, g. mmole | Reaction time, min. | Atmosphere | Conversion | Product analysis, mole percent | | | |
|---|---|---|---|---|---|---|---|---|---|---|---|---|
| | | | | | | | | | (1)[a] | (2)[a] | (3)[a] | (4)[a] |
| 9 | 57 | 13 | 108 | 16 | 6.51 | 960 | $N_2$ | 100 | 98.6 | -------- | ---- | 1.4 |
| 10 | 74 | 13 | 108 | 16 | 10 | 366 | Argon | 96.3 | 90.2 | 1.1 | 2.9 | 2.9 |
| 11 | 74 | 15 | 68 | 16 | 10 | 1,575 | $O_2$ | 32 | 3.9 | 90.3 | ---------- | 5.8 |
| 12 | 74 | 13 | 108 | 16 | 10 | 245 | NO | 96.5 | 92.2 | 1.2 | 2.6 | 1.6 |

[a] Numbers represent the same compounds shown in Table I.

In the same manner as described in Examples 1–12, 2-(2,4,5-trichlorophenoxy)ethanol may be reacted in place of the 2,4-dichlorophenoxy ethanol compound to give (2,4,5-trichlorophenoxy)acetic acid.

Also in the same manner one mole of either substituted ethanol may be reacted with 1.3 to 2.6 moles of nitric acid at temperatures of 0° to 90° C. in 0.5 to 4 liters of a solvent which is 0.5/1 to 3/1 parts by weight benzenesulfonic acid in water and sufficient sulfuric acid to maintain the total acid concentration of the reaction mixture at 6 N to 13 N.

We claim:

1. The process for oxidizing 2-(2,4-dichlorophenoxy)ethanol or 2-(2,4,5-trichlorophenoxy)ethanol to the corresponding phenoxyacetic acid comprising reacting by contacting the substituted ethanol with nitric acid at a temperature of 0° to 90° C. in a solvent having at least 0.5/1 parts by weight of benzenesulfonic acid to water plus sufficient sulfuric acid to maintain the acid concentration of the reaction mixture between 6 N to 13 N throughout the reaction.

2. The process of claim 1 wherein the ratio of benzenesulfonic acid to water is 0.5/1 to 2/1.

3. The process of claim 1 wherein the acid concentration of the reaction mixture is 7 N to 12 N.

4. The process of claim 1 wherein the ratio of solvent to alcohol is 0.5–4 liter per gram mole.

5. The process of claim 4 wherein the ratio of solvent to alcohol is 0.8 to 2 liters per mole.

6. The process of claim 1 wherein a 10 to 100 percent stoichiometric molar excess of nitric acid is employed.

7. The process of claim 1 wherein the reaction is conducted under an essentially oxygen-free atmosphere.

8. The process of claim 7 wherein the atmosphere is nitrogen, helium, argon, nitric oxide, nitrogen dioxide or mixture thereof.

9. The process of claim 1 wherein the temperature is 25° to 60° C.

10. The process of claim 1 wherein 2-(2,4-dichlorophenoxy)ethanol is reacted.

* * * * *